United States Patent [19]

Maitz

[11] Patent Number: 5,415,799

[45] Date of Patent: May 16, 1995

[54] PUR HOT MELT CLEANING METHOD

[75] Inventor: Franz Maitz, Bruckmühl, Germany

[73] Assignee: H.B. Fuller Company, Arden Hills, Minn.

[21] Appl. No.: 202,357

[22] Filed: Feb. 28, 1994

Related U.S. Application Data

[62] Division of Ser. No. 980,606, Nov. 23, 1992, Pat. No. 5,348,680.

[30] Foreign Application Priority Data

Nov. 27, 1991 [DE] Germany ............... 9114780 U

[51] Int. Cl.⁶ ............... C11D 7/26; C11D 7/40
[52] U.S. Cl. ............... 252/162; 252/174.23; 252/DIG. 2; 134/38; 134/40; 134/42; 528/49; 525/440; 525/454; 525/458
[58] Field of Search ............... 134/38, 40, 42; 252/174.23, 162, DIG. 2; 528/49; 525/440, 454, 458

[56] References Cited

U.S. PATENT DOCUMENTS

| | | | |
|---|---|---|---|
| 4,731,126 | 3/1988 | Dixit et al. | 134/38 |
| 4,838,945 | 6/1989 | Fuji et al. | 134/7 |
| 4,838,948 | 6/1989 | Bailey | 134/8 |
| 4,863,524 | 9/1989 | Komabashiri et al. | 134/22.19 |
| 4,976,788 | 12/1990 | Nohr et al. | 134/5 |
| 5,064,557 | 11/1991 | Fusiak | 252/162 |
| 5,124,383 | 6/1992 | Ohama et al. | 524/115 |
| 5,128,788 | 1/1992 | Marquis et al. | 252/162 |
| 5,139,694 | 8/1992 | Kmiec | 252/174.23 |
| 5,145,597 | 9/1992 | Rodriguez et al. | 252/135 |
| 5,238,608 | 8/1993 | Ohama et al. | 252/535 |
| 5,298,078 | 3/1994 | Itoh et al. | 134/9 |

FOREIGN PATENT DOCUMENTS

| | | |
|---|---|---|
| 660955 | 9/1965 | Belgium . |
| 344681A3 | 11/1989 | European Pat. Off. . |
| 72964 | 8/1968 | German Dem. Rep. . |
| 2819577 | 11/1979 | Germany . |
| 0154446 | 3/1982 | Germany . |

*Primary Examiner*—Paul Lieberman
*Assistant Examiner*—Michael P. Tierney
*Attorney, Agent, or Firm*—Vidas, Arett & Steinkraus

[57] ABSTRACT

A cleaning composition for removing reactive polyurethane (PUR) hot melt adhesives from production and processing devices, machines and equipment which includes at least one reactive monofunctional hydroxyl compound which can react with the reactive isocyanate groups of the hot melt adhesive. The monohydroxy functional compound of the invention's clean composition completely saturates the remaining NCO groups of the hot melt adhesive to be removed, converting the adhesive into non-reactive, meltable compounds which are soluble in the cleaning composition.

19 Claims, No Drawings

PUR HOT MELT CLEANING METHOD

CROSS REFERENCE TO RELATED APPLICATIONS

This application is a division of U.S. patent application Ser. No. 07/980,606 filed Nov. 23, 1992 now U.S. Pat. No. 5,348,680.

BACKGROUND OF THE INVENTION

The invention relates to a cleaning composition for removing reactive polyurethane (PUR) hot melt adhesive compositions from production and processing devices, machines and equipment, in particular application apparatus and the like.

Known cleaning compositions are formed by substances which do not react chemically with the hot melt adhesive, instead only mixing with the adhesive which remains in and is to be removed from, the apparatus to be cleaned, and only diluting and displacing said adhesive.

A known cleaning composition of this kind consists of a mixture of an ethyl vinyl acetate (EVA) polymer with a resin component. The EVA polymer does not mix well with conventional PUR hot melt adhesives. Moreover, the hot melt adhesive—due to its still reactive NCO functionality—continues to react in the mixture to give cross-linked products which are very difficult to remove since they are unmeltable and essentially insoluble in the composition, and therefore form deposits.

As an alternative, compositions have recently been discussed (unpublished information) which are obtained by adding an exact amount (no excess) of a monofunctional alcohol to a reactive hot melt adhesive, whereby the reactive NCO groups of the PUR hot melt adhesive which are still present are completely stoichiometrically saturated by the hydroxyl groups of the monofunctional alcohol. The mass thus formed, which in total is not reactive (anymore), approximately corresponds to the known cleaning composition on EVA basis in its application properties, and specifically does not react with the PUR adhesive in the apparatus during cleaning. These compounds, therefore, when used to remove unreacted adhesive, would also exhibit the disadvantage that no neutralization of the reactive NCO groups of the PUR hot melt adhesive is achieved so that in this case, too, the PUR hot melt adhesive would continue to react even during cleaning. The PUR hot melt adhesive again would react to give unmeltable and insoluble end products which are very difficult to remove.

SUMMARY OF THE INVENTION

A cleaning composition for PUR hot melt adhesives should meet the following requirements:

The cleaning composition should mix well with the PUR hot melt adhesive.

The cleaning composition should suppress a further reaction of the reactive PUR hot melt adhesive which reaction would result in structures leading to the formation of unmeltable products insoluble in the cleaning composition.

The cleaning composition should not itself cause any undesirable reactions. Thus it is an object of the present invention to provide cleaning compositions of the aforementioned kind which meet these requirements and overcome the above-mentioned disadvantages of the prior art.

For achieving this object, the invention provides for the cleaning composition to contain an NCO reactive monohydroxy functional compound as an essential component, besides, in case, other additional components. The monohydroxy functional compound of the invention's cleaning composition completely saturates the remaining NCO groups of the hot melt adhesive to be removed, converting the adhesive into non-reactive, meltable compounds which are soluble in the cleaning composition.

In a preferred embodiment of the invention, the cleaning composition contains a mixture of a, preferably plastically deformable, mass which does not react with the PUR hot melt adhesive to be removed, and a monohydroxy functional compound which is capable of completely neutralizing the remaining NCO groups of the PUR hot melt adhesive.

Advantageous further embodiments are defined in the subclaims.

If no non-reactive additional component is to be incorporated, the NCO reactive compound can e.g. be abietyl alcohol.

Preferably a non-hardening polyurethane compound is used as the non-reacting mass of the cleaning composition. Polyol polymers, in particular polyesters, polyethers, polyester esters and polyester polyether colypolmers, are suitable as starting material for this purpose. After complete stoichiometrical saturation of the hydroxyl functions of the polyol polymer e.g. with a monofunctional isocyanate compound, a monohydroxy functional compound with NCO reactive properties is added as a second component, preferably in amounts of 10 to 100 milli-equivalents (based on 100 g of total compound).

During use of the cleaning composition, this NCO reactive mono hydroxy functional component completely saturates or neutralizes the remaining isocyanate groups of the polyurethane hot melt adhesive to be removed, turning the latter into a non reactive, soluble end product.

As an alternative, the non-reacting mass can be formed from a moisture-reactive hot melt adhesive similar to the PUR hot melt adhesive to be removed, the NCO functionality of the former being fully stoichiometrically saturated with a mono hydroxy functional compound in this case, too, a content of in particular 10 to 100 milli-equivalents (based on 100 g of total compound) of a monohydroxy functional compound is additionally provided as the NCO reactive component, which completely saturates the residual NCO functionality of the PUR hot melt adhesive to be cleaned and removed, and converts the adhesive into a non-reactive soluble form.

Advantageously, both the two monohydroxy functional compounds are identical in this case, i.e. in producing the cleaning composition, hot melt adhesive is simply reacted with a suitable excess of a monofunctional hydroxyl compound.

The NCO reactive monohydroxy functional compound is chosen with regard to the conditions of intended application of the invention's cleaning composition. Suitable monohydroxy functional compounds are e.g. abietyl alcohol and monovalent alcohols or partially etherified monomeric or polymeric polyols, e.g. on PEG or PPG basis, hydroxy carboxylic acid esters, polycaprolactones and the like.

As the temperature during the cleaning process is typically 130° to 150° C., the flame point or ignition temperature should be correspondingly high. On the other hand, compounds having a low molecular weight are preferred, since the consumption of substance is thus automatically reduced and favorable melting and solution characteristics of the reaction product are obtained.

Monohydroxyl polyethers are particularly suited as monohydroxy functional compounds since all of them have high flame points. The high molecular weight of these compounds, however, can be disadvantageous in some applications.

The use of abietyl alcohol as the monohydroxy functional compound in one-component cleaning compositions is preferred. For cleaning compositions consisting of a mixture including non reactive carriers, the use of methyl benzyl alcohol has proven to be particularly advantageous. Both monohydroxy functional compounds excellently meet the above-mentioned requirements.

To completely neutralize the moisture-reactive PUR hot melt adhesive, the cleaning composition is preferably used at an NCO:OH ratio of 1:1 with respect to the PUR hot melt adhesive to be removed. The content of NCO reactive compound in the cleaning composition can be favorably chosen such that the desired NCO:OH ratio corresponds to the mixing ratio of cleaning composition:hot melt adhesive.

In case, the cleaning composition may also contain resin, plasticizer, wax, non-NCO-reactive polymers and the like as additional components, e.g. to influence and adjust the viscosity and processing properties of the polymer compound.

The two following embodiment examples are merely provided to elucidate the invention but are not intended to restrict it in any way.

EMBODIMENT EXAMPLE 1

A cleaning composition is produced from abietyl alcohol at an NCO:OH ratio of 1:1 with regard to the PUR hot melt adhesive to be removed, the viscosity and the processing properties being correspondingly adjusted by adding resin, wax and the like. Abietol-E ™ by Hercules is used as the abietyl alcohol.

EMBODIMENT EXAMPLE 2

A cleaning composition is produced by stoichiometrically reacting high molecular weight polycaprolactone having a low content of OH groups with tosyl isocyanate as the monofunctional isocyanate compound, until the free hydroxyl groups of the polycaprolactone are fully neutralized. Subsequently approx. 5% of methyl benzyl alcohol is added as the NCO reactive component. The viscosity is adjusted by adding resin.

EMBODIMENT EXAMPLE 3

A cleaning composition is produced by mixing Ipatherm® S 14/176 (a polyurethane hot melt adhesive containing about 2% of remaining or residual NCO functionality) with methyl benzyl alcohol at an excess of about 5% of the amount necessary for completely saturating the NCO groups still present in the adhesive to be removed.

What is claimed is:

1. A method for removing polyurethane (PUR) hot melt adhesives having residual reactive NCO groups from production and processing devices, machines and equipment, said method including the steps of:

(a) providing a cleaning composition comprising:
      (i) at least one reactive monohydroxy functional compound which can react with the reactive NCO groups of a hot melt adhesive; and
      (ii) a non-reacting mass comprising a polyurethane free of NCO groups;
   (b) thoroughly mixing the cleaning composition with the PUR hot melt adhesive in the production and processing devices, machines and equipment, whereby the monohydroxy functional compound completely reacts with the residual NCO groups of the hot melt adhesive to be removed, converting the adhesive into end products which are non-reactive, meltable polyurethane compounds which are soluble in the cleaning composition; and
   (c) removing the cleaning composition including the reaction end products of the PUR adhesive and the cleaning composition.

2. The method of claim 1 wherein:
   (a) the monohydroxy functional NCO reactive compound is abietyl alcohol in an amount to provide an NCO:OH ratio of 1:1 with regard to the PUR hot melt adhesive to be removed; and
   (b) the cleaning composition further includes a component selected from the group consisting of wax and plasticizers.

3. The method of claim 1 wherein the cleaning composition comprises a mixture produced by:
   (a) preparing said non-reacting mass by stoichiometrically reacting polycaprolactone having a low content of OH groups with tosyl isocyanate, until the free hydroxyl groups of the polycaprolactone are fully neutralized; and then
   (b) adding about 5% of methyl benzyl alcohol as the monohydroxy functional NCO reactive compound.

4. The method of claim 1 wherein the cleaning composition is produced by mixing a polyurethane hot melt adhesive containing about 2 % of residual NCO functionality with methyl benzyl alcohol at an excess of about 5 % of the amount necessary for completely saturating the NCO groups still present in the adhesive to be removed.

5. The method of claim 1 wherein the cleaning composition contains a etherified polymeric polyol or hydroxy ether component as the monohydroxy functional NCO reactive compound, 6. The method of claim 1 wherein the monohydroxy functional NCO reactive compound is abietyl alcohol.

7. The method of claim 3 wherein the cleaning composition contains the monohydroxy functional NCO reactive compound in an amount of 10 to 100 milliequivalents, based on 100 grams of total cleaning composition.

8. The method of claim 1 wherein the non-reacting mass is plastically deformable at temperatures of 130°–150° C.

9. The method of claim 8 wherein the cleaning composition contains the stoichiometric reaction product of a polymeric polyol component and a monofunctional NCO compound as the non-reacting mass.

10. The method of claim 8 wherein the non-reacting mass is the stoichiometric reaction product of a polyurethane hot melt adhesive with a monohydroxy functional compound.

11. The method of claim 10 wherein the monohydroxy functional compound used to prepare said non-reacting mass is a hydroxy ether or an alcohol.

12. The method of claim 11 wherein the monohydroxy functional compound used to prepare said stoichiometric reaction product is methyl benzyl alcohol.

13. The method of claim 8 wherein the non-reacting mass comprises a polyurethane comprising a reaction product of a monofunctional isocyanate compound and a polyol polymer selected from the group consisting of a polyester, a polyether, a polyether ester or a polyester polyether copolymer.

14. The method of claim 8 wherein the monohydroxy functional NCO reactive compound is a hydroxyether or an alcohol.

15. The method of claim 14 wherein the monohydroxy functional NCO reactive compound is methyl benzyl alcohol.

16. The method of claim 8 wherein the monohydroxy functional NCO reactive compound is present in an amount of 10 to 100 milli-equivalents, based on 100 grams of total composition.

17. The method of claim 1 wherein the cleaning composition further comprises at least one additional component selected from the group consisting of waxes and plasticizers.

18. A method for removing an uncured reactive polyurethane (PUR) hot melt adhesive from an article, the adhesive comprising a compound having residual NCO groups thereon, said method including the steps of:
 (a) providing a cleaning composition comprising an NCO reactive component said component consisting of one or more reactive monohydroxy functional compounds which can react with the reactive NCO groups of a hot melt adhesive, said reactive component comprising the only NCO reactive component of the cleaning composition;
 (b) thoroughly mixing the cleaning composition with the PUR hot melt adhesive on said article whereby the monohydroxy functional compound reacts with the remaining NCO groups of the hot melt adhesive to be removed, converting the adhesive into end products which are non-reactive, meltable polyurethane compounds which are soluble in the cleaning composition; and
 (c) removing the cleaning composition including the reaction end products of PUR adhesive and the cleaning composition.

19. The method of claim 18 wherein the monohydroxy functional NCO reactive compound is abietyl alcohol.

* * * * *

UNITED STATES PATENT AND TRADEMARK OFFICE
CERTIFICATE OF CORRECTION

PATENT NO. : 5,415,799
DATED : May 16, 1995
INVENTOR(S) : Maitz

It is certified that error appears in the above-indentified patent and that said Letters Patent is hereby corrected as shown below:

On the title page: Item [73] Assignee: should read --H. B. Fuller Licensing & Financing, Inc. --.

Signed and Sealed this

Twenty-first Day of May, 1996

Attest:

BRUCE LEHMAN

*Attesting Officer*     *Commissioner of Patents and Trademarks*